United States Patent
Lee et al.

(10) Patent No.: US 7,904,222 B2
(45) Date of Patent: Mar. 8, 2011

(54) TRAILER ARTICULATION ANGLE ESTIMATION

(75) Inventors: Yong H. Lee, Troy, MI (US); Alexander Kade, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 918 days.

(21) Appl. No.: 11/769,021

(22) Filed: Jun. 27, 2007

(65) Prior Publication Data

US 2009/0005932 A1    Jan. 1, 2009

(51) Int. Cl.
*G01M 17/00* (2006.01)
*B62D 6/00* (2006.01)
*G06F 19/00* (2006.01)

(52) U.S. Cl. ...... 701/41; 701/36; 342/207.25; 340/932.2

(58) Field of Classification Search ............ 701/41, 701/46, 29, 36; 340/932.2, 431; 342/207.25
See application file for complete search history.

(56) References Cited

U.S. PATENT DOCUMENTS

| | | | |
|---|---|---|---|
| 5,097,250 A | 3/1992 | Hernandez | |
| 5,152,544 A | 10/1992 | Dierker, Jr. et al. | |
| 5,579,228 A | 11/1996 | Kimbrough et al. | |
| 5,912,616 A | 6/1999 | Valentino | |
| 6,268,800 B1 | 7/2001 | Howard | |
| 6,292,094 B1 | 9/2001 | Deng et al. | |
| 6,655,710 B2 * | 12/2003 | Lindell et al. | 280/419 |
| 6,806,809 B2 | 10/2004 | Lee et al. | |
| 6,838,979 B2 | 1/2005 | Deng et al. | |
| 6,923,080 B1 * | 8/2005 | Dobler et al. | 73/866.1 |
| 6,956,468 B2 | 10/2005 | Lee et al. | |
| 6,999,856 B2 | 2/2006 | Lee et al. | |
| 2006/0103511 A1 | 5/2006 | Lee et al. | |
| 2007/0067077 A1 * | 3/2007 | Liu et al. | 701/29 |

FOREIGN PATENT DOCUMENTS

JP    2002120775 A    4/2002

* cited by examiner

*Primary Examiner* — Tan Q Nguyen

(57) ABSTRACT

This invention takes the advantage of existing radar, vision and ultrasonic sensors available for side blind spot detection, rear view, rear virtual bumper, and rear parking assist. Using a sensor fusion technique to combine the useful information from these sensors, the trailer articulation angles as well as trailer track width and tongue length is accurately estimated. When an active steering system is present, vehicle and trailer can be controlled with increased stability by applying the trailer information.

3 Claims, 6 Drawing Sheets

TRAILER ARTICULATION ANGLE ESTIMATION

TECHNICAL FIELD

This invention is related generally to vehicle stability. More particularly, the invention is concerned with the traveling stability of a combination comprising a motorized vehicle and a load that is attached thereto, such as a trailer.

BACKGROUND OF THE INVENTION

Many motorized vehicles are designed to accommodate the towing or trailering of various loads, including without limitation: cargo hoppers, campers, boats, and sometimes other motorized vehicles. A wide range of systems and devices to enhance vehicle stability while towing is known. These devices may include simple add-ons such as airfoils and other vehicle trim pieces such as ground effects, which confer the vehicle with additional aerodynamic stability over its design control. Additionally, systems for traction control have been developed, as well as automatically-adjusting suspension systems which alter the height of the body of a vehicle in proportion to the weight of a load.

It often occurs that trailer design changes are made by engineers during the course of trailer design, without regard to the overall effect of their design changes may have on the stability of every possible vehicle/trailer combination of which their trailer is to be a part. Thus, it is natural that some vehicle/trailer combinations may be inherently more stable at highway speeds than others, and there is in general no way to reasonably predict the behavior of all such possible combinations, when faced with various challenging road situations, such as crosswinds, etc., prior to an actual road test.

It is known to mount sensors on the rear and side of vehicles to detect objects behind a vehicle for active safety features, such as vision sensors used for rear view and side blind zone object detection, and also radar sensors for side blind zone detection, rear object detection, and rear cross traffic detection. Ultrasonic sensors are often present on vehicles for assistance in rear parking maneuvers.

One of the major enablers for the development of a vehicle and trailer stability control system is the availability of a hitch angle sensor which can be independent of the trailer connected. A remote hitch angle sensing system is a key enabler for a low cost vehicle-trailer stability control. There are several known contact type hitch angle sensors which have been used for such application. However, these contact type sensors are cumbersome since trailers are frequently connected and disconnected, and a new calibration and adjustment is necessary following each such connection cycle.

In a general sense, it is desirable to provide systems having increased degree of reliability and integrity for aiding vehicle/trailer combinations than what has been previously available. One shortfall for trailer control systems has been the sensing of the trailer hitch articulation angle for a trailer control system. There remains a need in the art for utilization of the output of the aforementioned sensors in an improved synergistic fashion to provide greater stability while traveling and to provide means for directional control in vehicle/trailer backing and parking. The present systems and methods provide enhanced means for assisting in stabilizing vehicle/trailer combinations by providing a new and beneficial means for calculating the hitch articulation angle, using sensing means which are disposed solely on the motorized vehicle used for towing.

SUMMARY OF THE INVENTION

The present invention provides a system useful for determining the trailer hitch articulation angle of a trailer that is being towed behind a motorized vehicle. A system according to the invention employs sensing means which are disposed only on the motorized vehicle. The sensing means comprise one or more sensing means selected from: ultrasonic transducers, short-range radar transducers, and cameras. The sensing means comprise one or more sensing means selected from: ultrasonic transducers, short-range radar transducers, vision systems transducers, cameras and light-imaging detection and ranging transducers and systems (LIDAR).

The invention also provides a process for calculating the trailer hitch articulation angle in a combination comprising a motorized vehicle having a trailer comprising a wheeled axle that is pivotally-connected thereto. The motorized vehicle includes sensing means comprising one or more of: ultrasonic transducers, short-range radar transducers, and cameras. A process according to the invention comprises the steps of: a) acquiring position and range information concerning the trailer by means of the sensing means employed; b) conveying the position and range information to a microprocessor; c) calculating the trailer tongue length of the trailer; d) calculating the track width of the trailer; and e) calculating the trailer hitch articulation angle of the trailer.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF THE PREFERRED EMBODIMENT

The present invention provides a system for enhancement of vehicle/trailer stability, by assessing and assisting of vehicle control/trailer dynamics in real time, using one or more of a plurality of sensors that are mounted on the vehicle only, as opposed to the systems known in the prior art, that employ only trailer-mounted sensors.

According to the invention, parameters associated with the trailer, such as hitch angle and trailer tongue length are estimated accurately in real time for precise vehicle/trailer stability control, using only vehicle-mounted sensing means. The invention also provides a method which includes sensing the trailer articulation angle, using a set of sensors mounted on the rear and side of a vehicle to detect the position of objects being towed behind the vehicle. Once these parameters are estimated and/or calculated, they are usefully employed in generating audible or visual warning signals, or in providing electronic feedback to or within systems, methods and/or devices complementary to the present invention, including without limitation the systems and methods described in commonly assigned U.S. Pat. Nos. 6,838,979 and 6,999,856, each of which are herein incorporated by reference in their entirety. By use of the present invention, the need for a hitch articulation sensor can be eliminated.

In order to enhance the shortcomings of sensors which are sometimes employed in the prior art as the sole source of input in calculation of a parameter such as a distance, the present invention applies a sensor fusion technique using information and/or outputs from more than a single sensor, whereby, for example, the edge of a trailer can be detected using vision and radar, and processed to estimate hitch articulation angle and trailer tongue length. These parameters are the essential information necessary for trailer stability and parking control.

Figure 1:
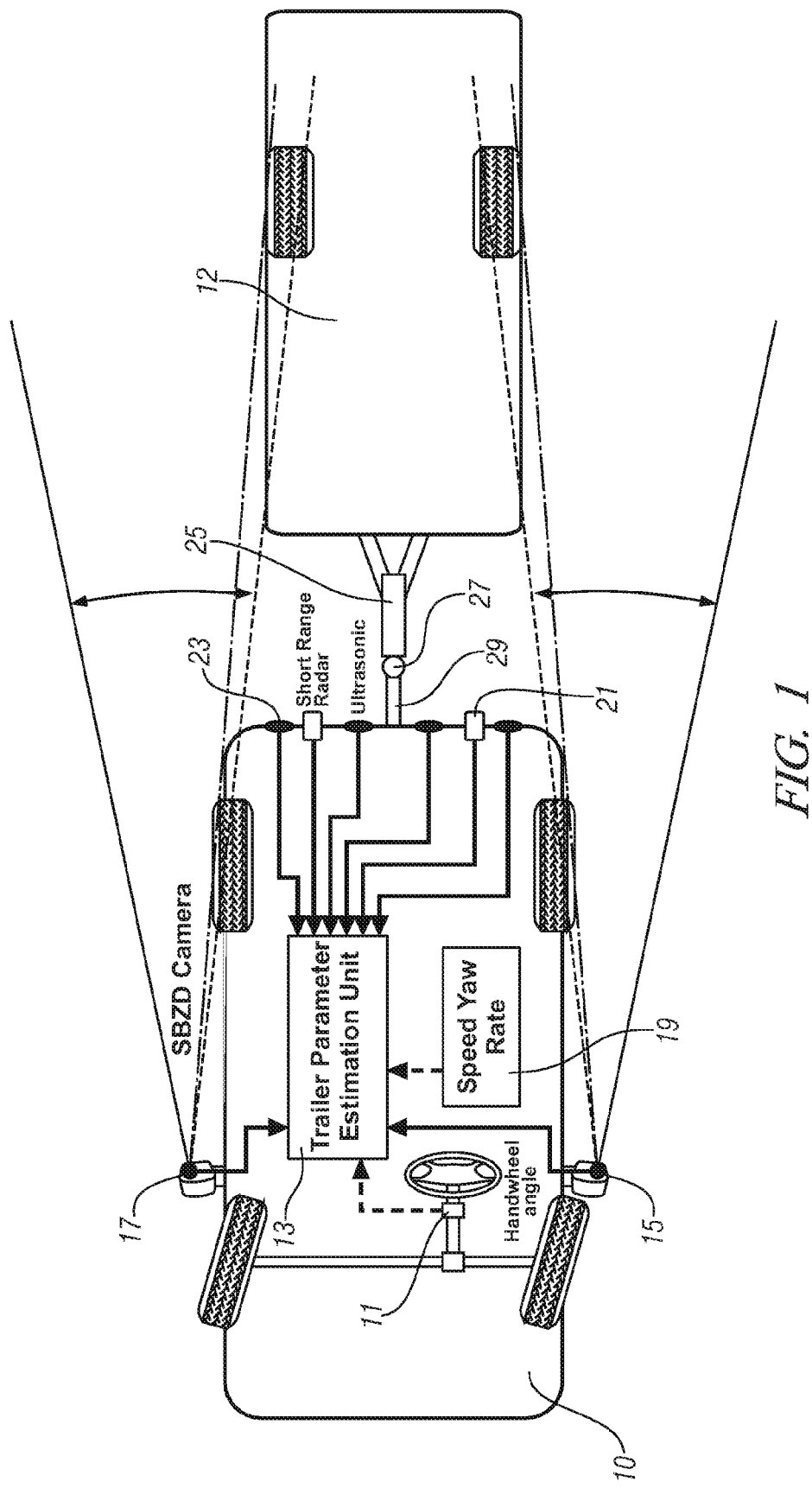
FIG. 1 shows an overhead view of a motorized vehicle having a trailer attached thereto.

Referring now to the drawings, wherein the showings are for the purpose of illustrating the invention only and not for the purpose of limiting the same, FIG. 1 shows an overhead view of a motorized vehicle 10 having a trailer 12 attached thereto, by means of a conventional hitching means, which includes a trailer tongue 25 pivotally connected at pivotal coupling 27 to the trailer hitch 29 of motorized vehicle 10, as is known in the art. The motorized vehicle 10 is preferably equipped with various sensors, including short-range radar transducer 21, ultrasonic sensor 23, steering-wheel angle sensor 11, yaw rate sensor 19, left side blind zone camera 15, and right side blind zone camera 17. There is a data processor 13, which preferably comprises a microprocessor, into which information gathered from each of the aforesaid sensors is inputted, for storage, aggregation, and processing purposes, towards computation of the trailer hitch articulation angle θ, as explained further below.

Figure 2:
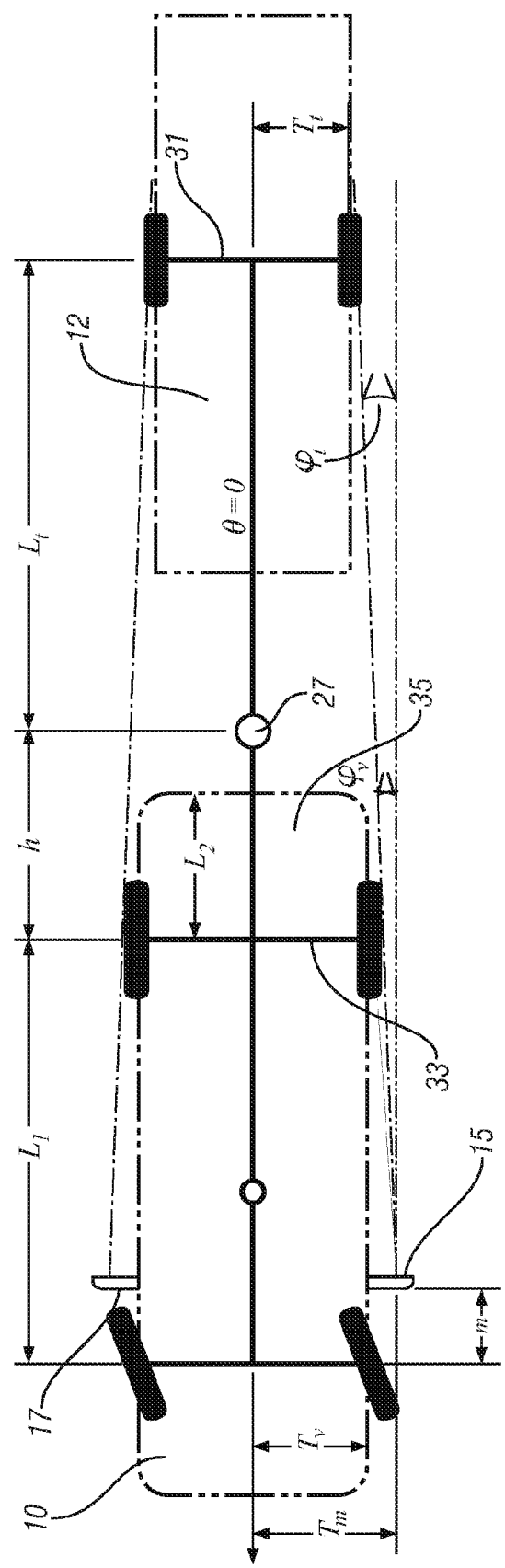
FIG. 2 shows an overhead schematic view showing pertinent parameters and angles present in a vehicle/trailer combination as shown in FIG. 1.

FIG. 2 is an overhead schematic view of a vehicle/trailer combination as shown in FIG. 1, which further includes location and definition of various physical parameters which are useful in a method and system according to the invention, for calculating the angle θ, the trailer hitch articulation angle. These parameters include: $L_1$, the vehicle wheelbase dimension; h, the distance from the rear axle 33 of the motorized vehicle 10 to the pivotal coupling 27; and Lt, the distance from the pivotal coupling 27 to the centerline of an axle 31 of the trailer 12. Lt is sometimes referred to as the trailer tongue length. Shown also is L2, which is the distance from the rear axle 33 of the motorized vehicle 10 to the end portion 35 of the body of the motorized vehicle 10. Tt is one-half of the track width distance of an axle on the trailer 12; Tv is one-half of the track of the motorized vehicle 10, and Tm is the distance from the centerline of the motorized vehicle 10 to the center of the left side blind zone camera 15. φv is the angle between the center of the left side blind zone camera 15 and the rear corner portion of the body of the motorized vehicle 10 with respect to the line of travel of the motorized vehicle 10 when it is traveling straight, in the forward direction, and φt is the azimuth angle between the center of the left side blind zone camera 15 and the wheel on an axle of trailer 12, with respect to the line of travel of the motorized vehicle/trailer combination when they are connected and are collectively traveling straight, in the forward direction. The parameter m is the distance between the center of rotation of a front left wheel of the motorized vehicle 10, and the visual sensor of the left side blind zone camera 15.

Figure 3:
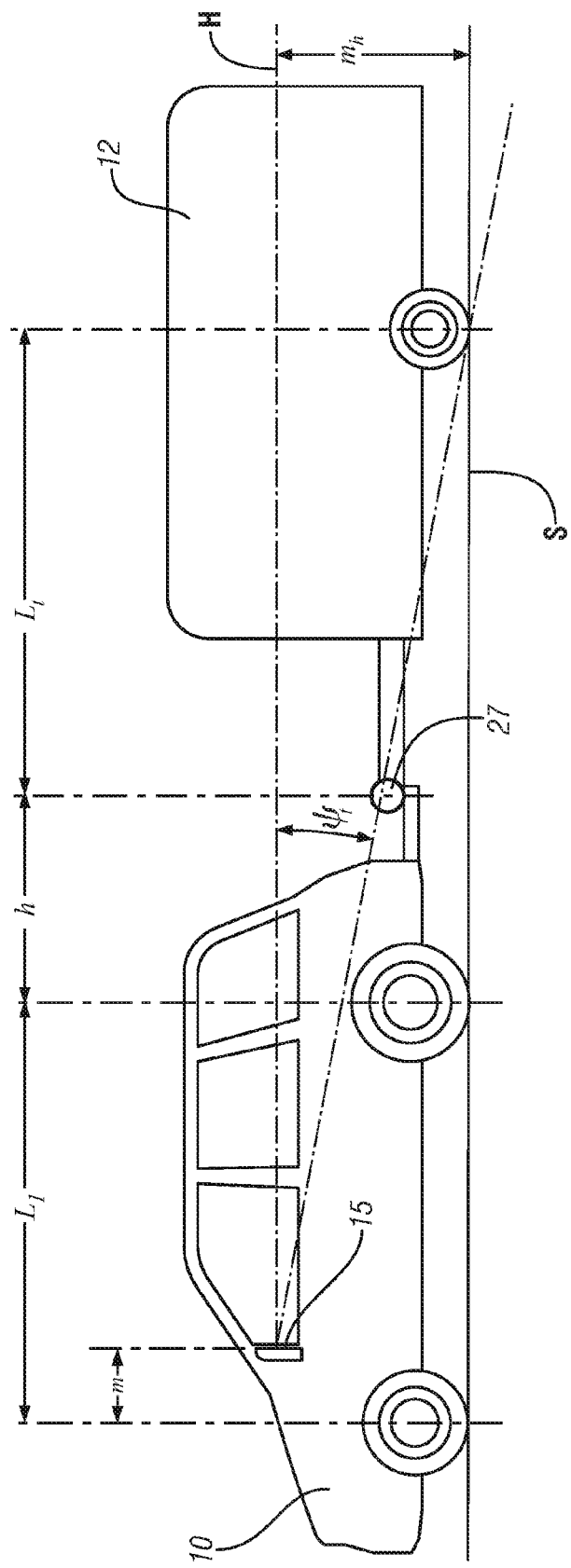
FIG. 3 shows a side elevation view of a motorized vehicle to which a trailer is pivotally-attached at a conventional fashion.

FIG. 3 is a side elevation view of a motorized vehicle 10 to which a trailer 12 is pivotally-attached at a conventional fashion. The parameters L1, h, Lt and m are the same parameters defined in FIG. 2 from the overhead view therein, and in FIG. 3 are further defined the parameters ψt and $m_h$. ψt is the angle between a horizontal line H that is disposed substantially parallel to the road surface, which horizontal line H intersects the lens of the left side blind zone camera 15, and a line extending from the point at which the wheel of the trailer contacts a road surface S upon which the trailer 12 resides to the intersection of the horizontal line H and the lens of the left side blind zone camera 15. The parameter $m_h$ is the vertical position of the center of the side blind zone camera 15 from the ground S.

Figure 4:
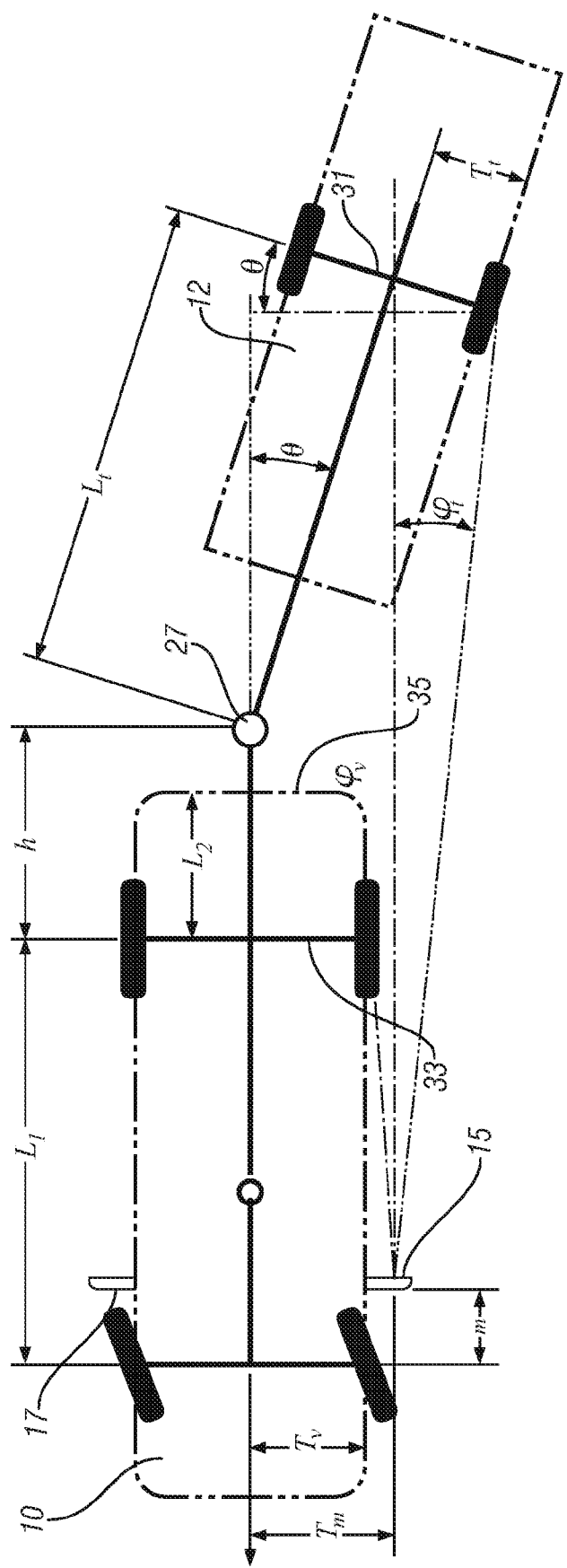
FIG. 4 shows an overhead schematic view of a vehicle/trailer combination as shown in FIGS. 1 and 2, in which the trailer is disposed in a position with its centerline forming an angle $\theta$ with respect to the centerline of the motorized vehicle.

FIG. 4 is an overhead schematic view of a vehicle/trailer combination as shown in FIGS. 1 and 2, with the trailer being disposed in a position wherein the centerline of the trailer 12 makes an angle θ with respect to the centerline of the motorized vehicle 10, which angle θ is referred to as the trailer articulation angle, with angle θ being of particular interest and use in providing stability to a vehicle/trailer combination according to a system and method of the invention. The relevant parameters again include: $L_1$; h; Lt; L2; Tt; Tv; Tm; φv; φt; and m, whose meanings have been defined above in reference to FIG. 2.

In seeking to calculate the trailer hitch articulation angle θ in real time, it is helpful to consider the relation in FIG. 3:

$$\frac{m_h}{L_1 - m + h + L_t} = \tan\psi_t \quad (1)$$

which relates the known parameters of m, h, $L_1$, $m_h$ and the measurable angle $\psi_t$, to the trailer tongue length $L_t$. $\psi_t$ is obtained from the left side blind zone camera 15. However, the right side blind zone camera 17 can be used to acquire similar data from the opposite side of the vehicle as shown in FIG. 3, owing to the general symmetry of the vehicle/trailer combination. In fact, all quantities discussed, which are obtained by considering the left side of the vehicle/trailer combination are generally valid for the right side of the vehicle/trailer combination as well. Equation (1) can be re-arranged thus:

$$L_t = \frac{m_h}{\tan\psi_t} + m - h - L_1. \quad (2)$$

Once the trailer tongue length Lt is known, other pertinent parameters can be calculated. It is beneficial to consider FIG. 2 and the relation:

$$\frac{T_v - T_m}{L_1 - m + L_t} = \tan\varphi_v \quad (3)$$

in which all variables are known, as it relates to the vehicle. Similarly, from the consideration of the trailer, the expression:

$$\frac{T_1 - T_m}{L_1 - m + h + L_t} = \tan\varphi_t \quad (4)$$

can be derived, which rearranges to:

$$L_t = \frac{T_1 - T_m}{\tan\varphi_t} - L_1 + m - h. \quad (5)$$

Referring now to FIG. 4, an expression can be created which relates the trailer hitch articulation angle θ to the values for the other parameters, some of which were known and some of which were measured by the side blind zone camera(s):

$$\frac{L_t \sin\theta + T_t \cos\theta - T_m}{L_1 - m + h + L_t \cos\theta - T_t \sin\theta} = \tan\varphi_t \qquad (6)$$

which simplifies to:

$$\theta = \sin^{-1}\left[\frac{T_m + (L_1 - m + h)\tan\varphi_t}{\sqrt{(T_t - L_t\tan\varphi_t)^2 + (L_t + T_t\tan\varphi_t)^2}}\right] - \delta_t \qquad (7)$$

wherein $$\delta_t = \sin^{-1}\left[\frac{T_t - L_t\tan\varphi_t}{\sqrt{(T_t - L_t\tan\varphi_t)^2 + (L_t + T_t\tan\varphi_t)^2}}\right]. \qquad (8)$$

Thus, by the above relations, we are able to obtain the values for Tt and Lt from consideration of known distance parameters on the motorized vehicle 10 and values obtained by the side blind zone cameras once the trailer 12 is attached to the motorized vehicle 10. Computation of the trailer hitch articulation angle may then be effected by carrying out the necessary calculations outlined above, which is preferably done by a data processor 13 that is on-board of the motorized vehicle 10. Advantageously, a short-range radar transducer 21 or an ultrasonic sensor 23 mounted to the rear of the motorized vehicle 10 is beneficial for providing instant measurement of the distance at which the forward portion of the trailer 12 is disposed from such sensors, to augment the data obtained from the side blind zone cameras. For example, the trailer articulation angle may be derived per the foregoing discussion at a particular point in time. There will be associated with a trailer articulation at such particular point in time outputs from short-range radar transducer(s) and/or ultrasonic sensor(s) as they interact with surfaces of the trailer 12 being towed, which outputs will depend on the specific geometry of the exterior features of the trailer 12. According to another embodiment, such output data from these sensors, which are associated with each trailer hitch articulation angle θ derived using the side blind zone camera(s), are collected, stored, and associated with each trailer hitch articulation angle θ derived from the side blind zone cameras alone, so that the side blind zone cameras are no longer necessary in determining the trailer hitch articulation angle θ. In another embodiment, the distance Lt is obtained directly from a short-range radar transducer mounted on the motorized vehicle 10. In another embodiment, the distance Lt is obtained directly from an ultrasonic sensor mounted on the motorized vehicle 10.

Figure 5:
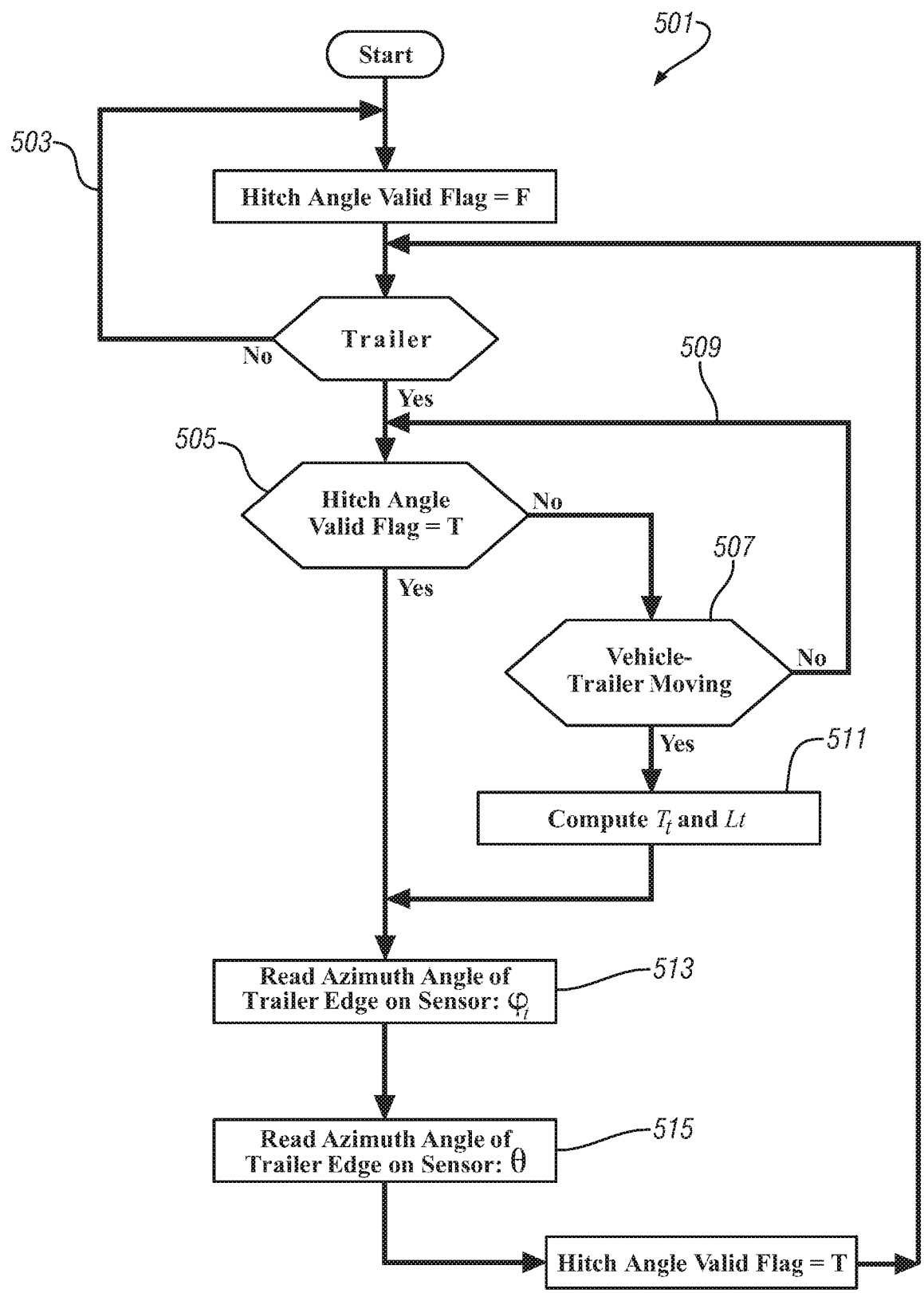
FIG. 5 shows an algorithm which is useful in the practice of a method according to the invention.

FIG. 5 shows an algorithm (501) which is useful in the practice of a method according to the invention. At the start, the sensors on board the motorized vehicle 12 search and detect for the presence of a trailer 12. If no trailer is present, the system will continue to attempt to locate a trailer (503). When a trailer 12 is present, the system determines whether a trailer hitch articulation angle θ has yet been calculated (505). If not, the system proceeds to determine whether the motorized vehicle/trailer combination is in motion (507). If there is no motion, then the system waits (509) until the motorized vehicle/trailer combination are in motion at which time data are collected and initial values for Tt, Lt, and the azimuth angle φt are calculated (511, 513), and all the relevant values are used in calculation of an initial trailer hitch articulation angle θ using equation (7) or an equivalent expression (515). The process is repeated periodically to provide continuous monitoring of the trailer hitch articulation angle θ.

Figure 6:
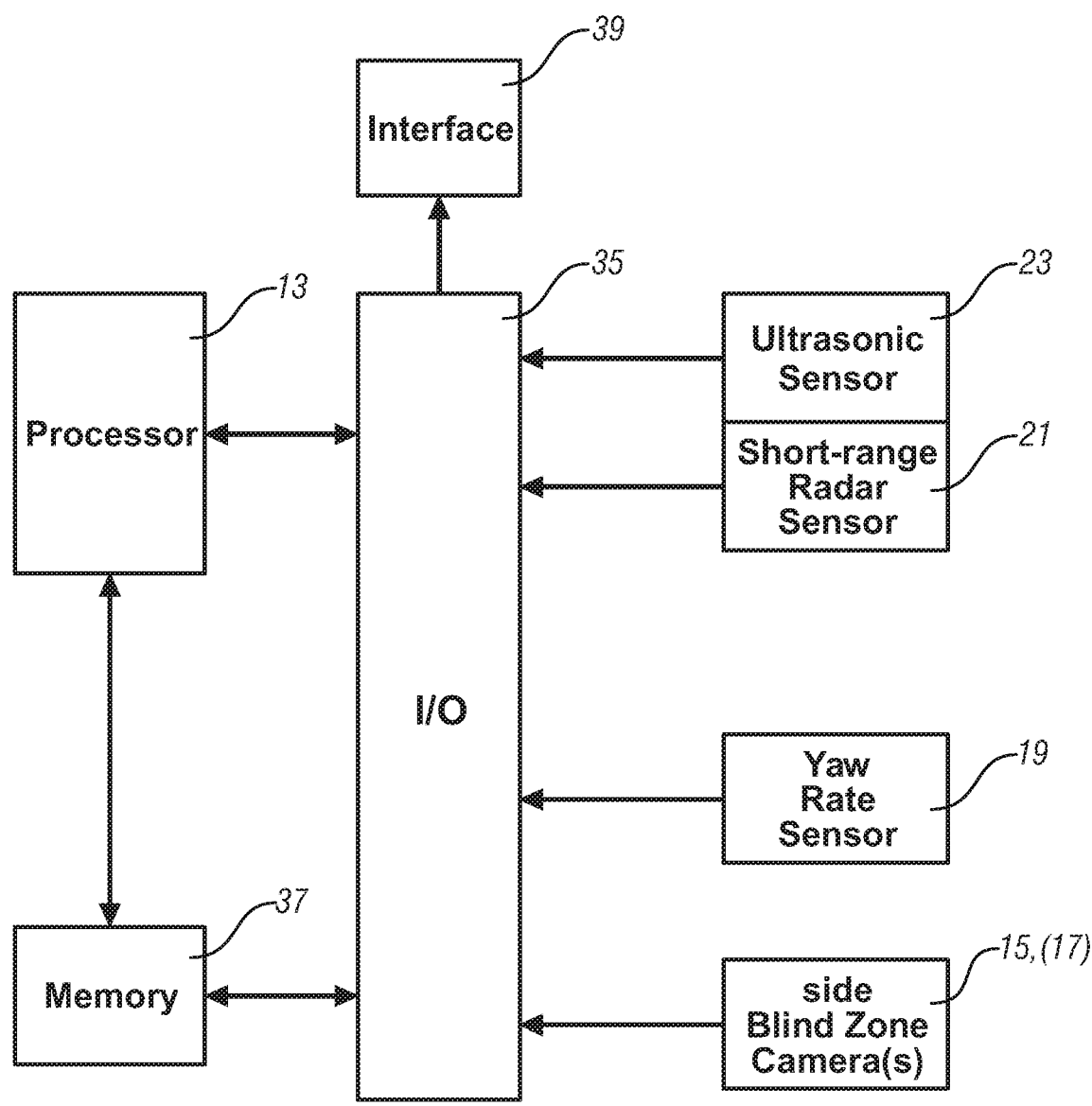
FIG. 6 shows a schematic of a processing scheme according to the invention.

FIG. 6 represents a schematic of a processing scheme according to one alternate embodiment of the invention. Shown is a controller 13 coupled to an associated memory unit 37. The controller 13 is coupled to a system I/O module 35 which is configured to accept signals from the various vehicle on-board sensors 15, (17), 19, 21, 23 and including other sensing means known in the art, including without limitation LIDAR sensing transducers and systems. The I/O module 35 is coupled to an interface 39, which may be a display that is readable by the driver of the motorized vehicle, or which interface 39 may alternately comprise a coupling that is fed as an input to an additional processor, as described, to cite but one example, in U.S. Pat. No. 6,838,979, whose algorithm may be used in providing an alarm as taught therein based on values for angle θ provided by the present invention. In yet another alternate embodiment, the interface 39 is connected to a servo-actuator that is mechanically linked to the steering control system of the motor vehicle. In yet another alternate embodiment, the interface 39 is connected to a servo-actuator that is mechanically linked to the braking system of the motor vehicle.

Thus, the systems and methods provided by the invention enable estimation of the articulation angle θ without any contact of any portions of the trailer 12. Additionally, all sensors are on the motorized vehicle 10. A system according to the invention is self-calibrating and self-correcting, in real time and uses readily-available sensors.

While the invention has been described by reference to certain embodiments, it should be understood that changes can be made within the spirit and scope of the inventive concepts described. Accordingly, it is intended that the invention not be limited to the disclosed embodiments, but that it have the full scope permitted by the language of the following claims.

The invention claimed is:

1. A process for calculating a trailer hitch articulation angle in a combination comprising a motorized vehicle having a trailer comprising a wheeled axle that is pivotally-connected thereto, said motorized vehicle including at least one non-contacting sensor comprising a camera, said process comprising:

acquiring trailer position and range information including an azimuth angle between a center of the camera on said vehicle and a wheel on said wheeled axle of said trailer from said camera;

conveying said information to a microprocessor;

determining a trailer tongue length of said trailer from the trailer position and range information acquired from said camera;

determining a track width of said trailer from the trailer position and range information acquired from said camera; and calculating a trailer hitch articulation angle of said trailer based on the determined trailer tongue length and the determined track width of said trailer.

2. The process of claim 1, wherein calculating the trailer hitch articulation angle of said trailer based on the determined trailer tongue length and the determined track width of said trailer includes calculating the trailer hitch articulation angle of said trailer in accordance with the following relationship:

$$\theta = \sin^{-1}\left[\frac{T_m + (L_1 - m + h)\tan\varphi_t}{\sqrt{(T_t - L_t\tan\varphi_t)^2 + (L_t + T_t\tan\varphi_t)^2}}\right] - \delta_t$$

wherein
- θ is the trailer hitch articulation angle,
- $L_1$ comprises a wheelbase of the motorized vehicle,
- m is a distance between a center of rotation of a front left wheel of the motorized vehicle and a center of the camera,
- h is a distance from a rear axle of the motorized vehicle to a pivotal coupling pivotally connecting the motorized vehicle and the trailer,
- $L_t$ is the trailer tongue length of said trailer,
- $T_t$ is one-half of the track width of said trailer,
- $T_m$ is the distance from the centerline of the motorized vehicle to the center of the camera,
- φt is the azimuth angle between the center of the camera on said vehicle and the wheel on the wheeled axle said trailer, and $$\delta_t = \sin^{-1}\left[\frac{T_t + L_1 \tan\varphi_t}{\sqrt{(T_t - L_t\tan\varphi_t)^2 + (L_t + T_t\tan\varphi_t)^2}}\right].$$

3. A process for calculating a trailer hitch articulation angle in a combination comprising a motorized vehicle having a trailer comprising a wheeled axle that is pivotally-connected thereto, said motorized vehicle including at least one non-contacting sensor comprising a camera having a lens, said process comprising:

acquiring trailer position and range information including an angle between a point at which a wheel of the trailer contacts a road surface upon which the trailer resides and a horizontal line disposed substantially parallel to the road surface, which horizontal line intersects the lens of said camera;

conveying said information to a microprocessor;

determining a trailer tongue length of said trailer from the trailer position and range information acquired from said camera;

determining a track width of said trailer from the trailer position and range information acquired from said camera; and calculating a trailer hitch articulation angle of said trailer based on the determined trailer tongue length and the determined track width.

* * * * *